A. AMSDEN.
Harvester Cutter.
No. 17,357. Patented May 26, 1857.
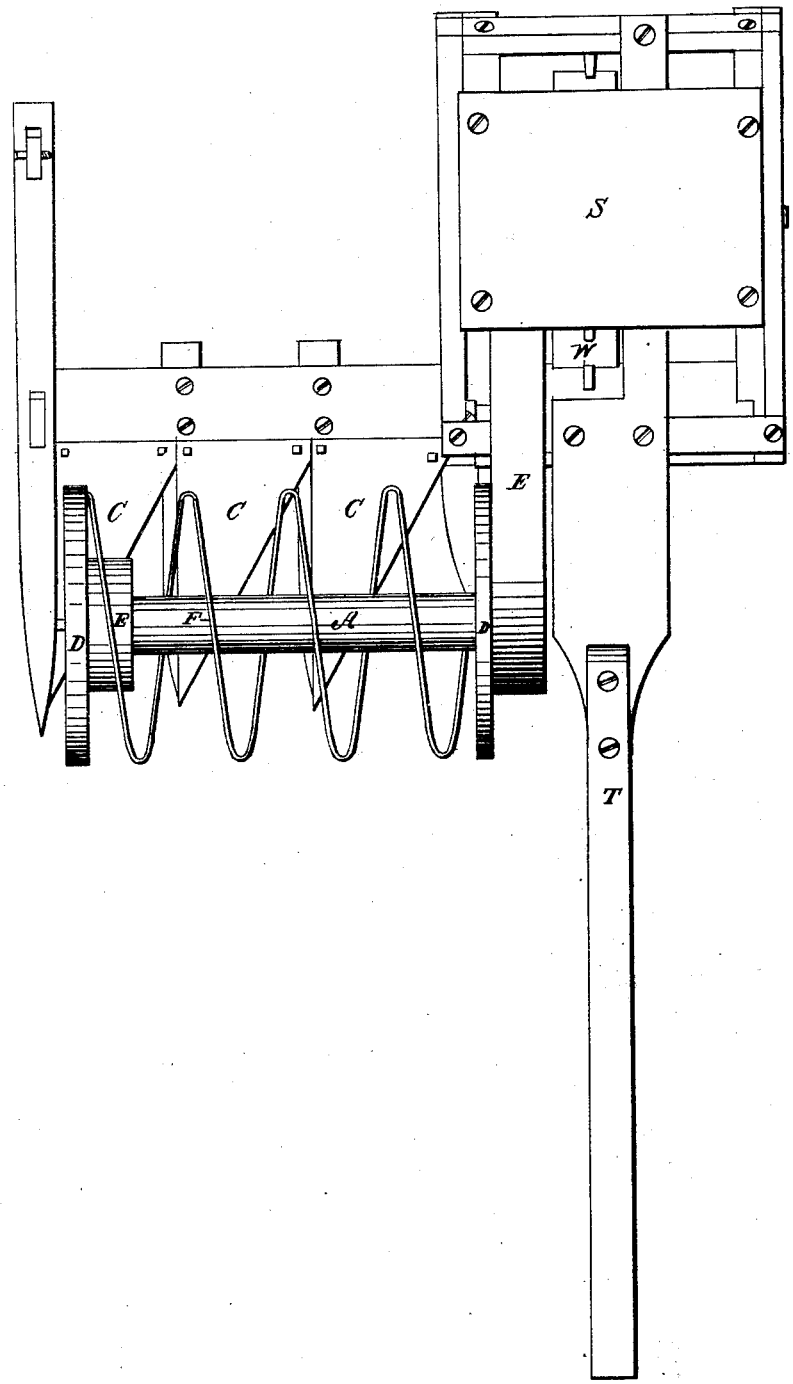

UNITED STATES PATENT OFFICE.

AMORY AMSDEN, OF ROCHESTER, NEW YORK.

IMPROVEMENT IN MOWING AND REAPING MACHINES.

Specification forming part of Letters Patent No. 17,357, dated May 26, 1857.

*To all whom it may concern:*

Be it known that I, AMORY AMSDEN, of the city of Rochester, in the county of Monroe and State of New York, have made and invented certain new and useful Improvements in Mowing and Reaping Machines, of which the following is a description, reference being had to the accompanying drawing, making a part of this specification, and to the letters of reference marked thereon.

In said drawing a plan of my machine is given, C C C being the knives or cutters; T, the tongue or pole, and S the driver's seat.

The nature of this invention consists in an improved mode of producing that shearing action which has been found essential in cutting grain or grass, and which has hitherto been obtained by the use of reciprocating blades, or by means of cutting arms arranged in a spiral form, but not in the peculiar and continuous manner to be hereinafter fully described. In my machine the same effect is produced by means of a continuous screw, F, placed immediately over the knives, as seen in the figure, and which in its revolution acts as a continuous wedge or inclined plane to crowd the grass or grain against the edge of the knives or cutters. This spiral or continuous screw may consist simply of a rod of iron twisted into the proper form and attached to two disks, as seen in the drawing; or it may be constructed of a sheet of metal of the desired form. In cases where a simple rod is used it may be braced by means of radial arms extending from the axis and attached to the rod forming the spiral; and in either case, if desired, projecting arms may be attached to said spiral, so as to give it a greater hold upon the grass or grain. As these additions or modifications do not affect the principal or main feature of my machine, however, it is unnecessary further to describe them, they not being regarded as essential to its working. The spiral or continuous screw aforesaid, being attached to the disks D D and axis A, is caused to revolve by means of the belt E, which passes over a pulley attached to the driving-wheel W, any desired speed being given to this spiral by regulating the relative sizes of the two pulleys.

Having thus described my invention, I do not claim giving the bars of a reel or of a cutting-wheel an inclined or spiral direction, such being a well-known device; but

What I do claim is—

The combination of the continuous helix F with the cutters C C, when said helix forces the grass or grain against the cutters in a direction transverse to the direction in which the helix revolves, for the purpose above set forth.

AMORY AMSDEN. [L. S.]

Witnesses:
G. W. TURNER,
BENJ. A. ORMSBEE.